May 3, 1949.　　　C. C. H. RASMUSSEN　　　2,468,778
COOKING EQUIPMENT
Filed March 24, 1945　　　　　　　　　　　4 Sheets-Sheet 1
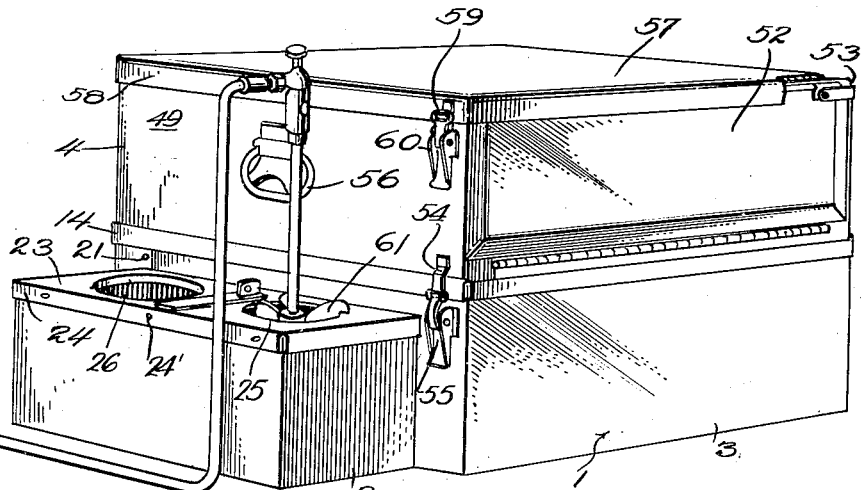
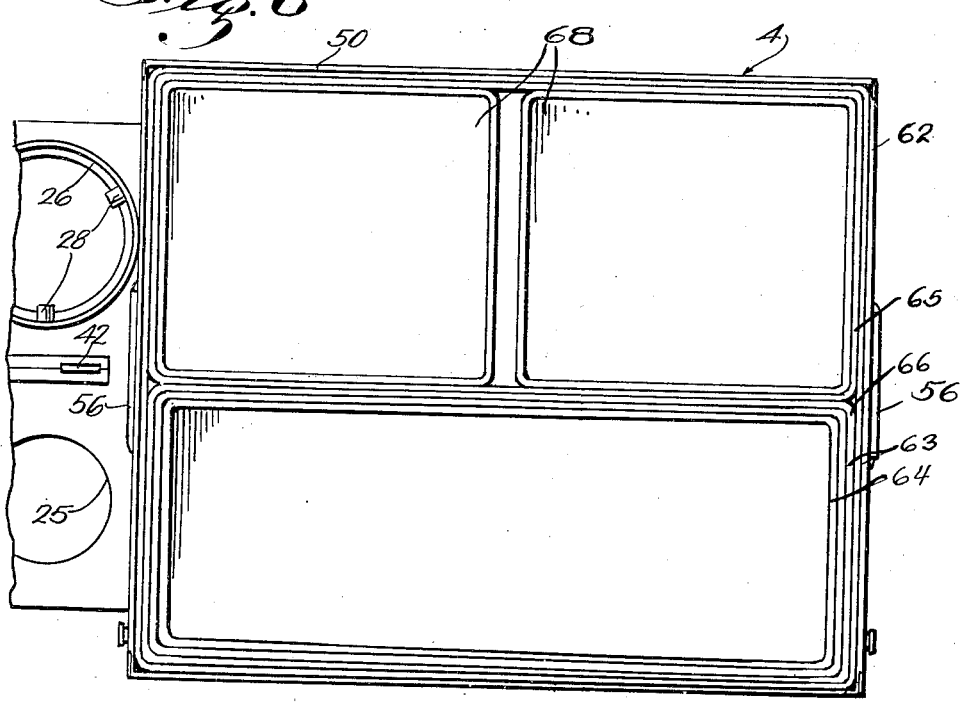
INVENTOR.
Carl C.H. Rasmussen
BY
William F. Desmond
ATTORNEY.

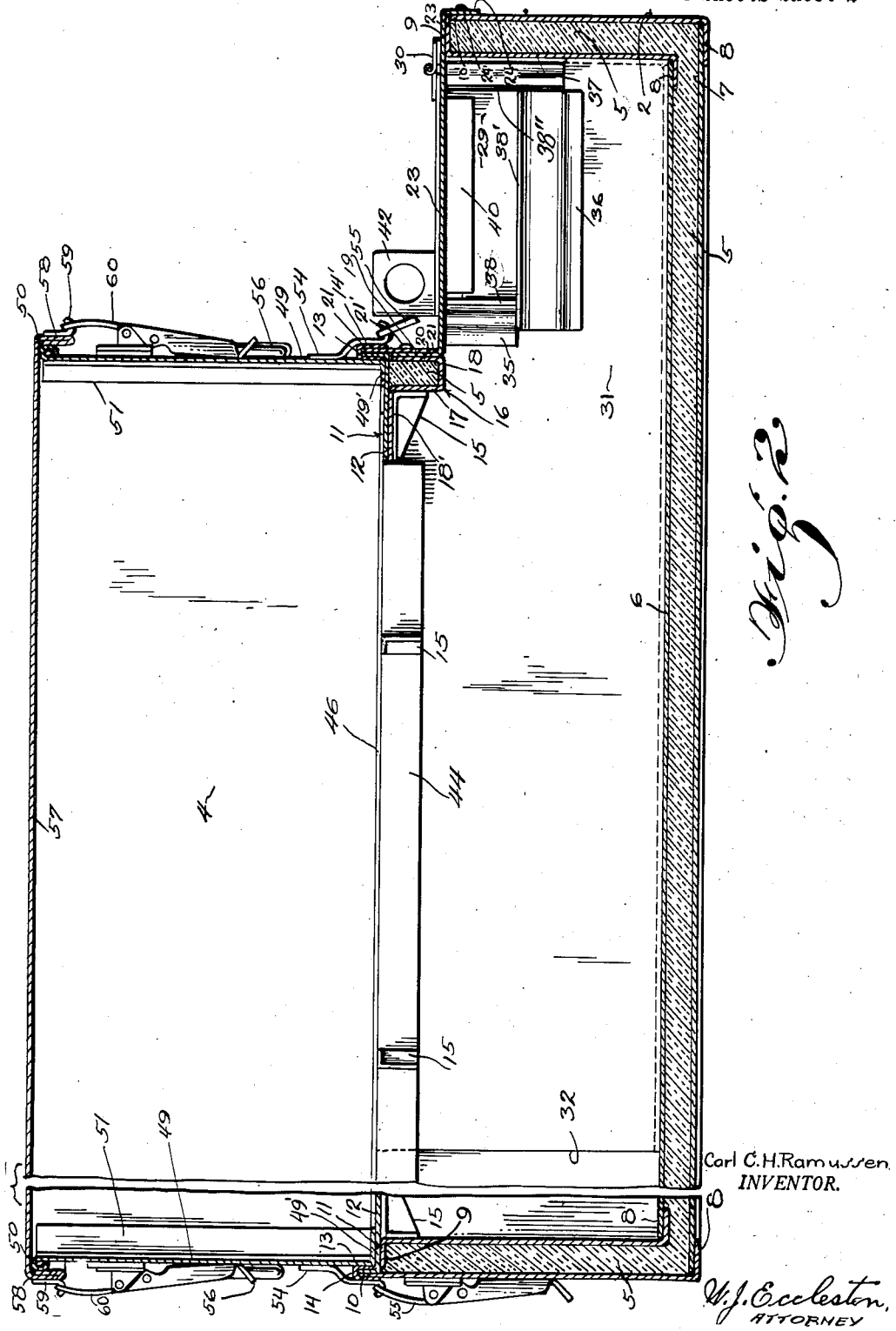

May 3, 1949.　　　C. C. H. RASMUSSEN　　　2,468,778
COOKING EQUIPMENT
Filed March 24, 1945　　　　　　　　　　　4 Sheets-Sheet 3
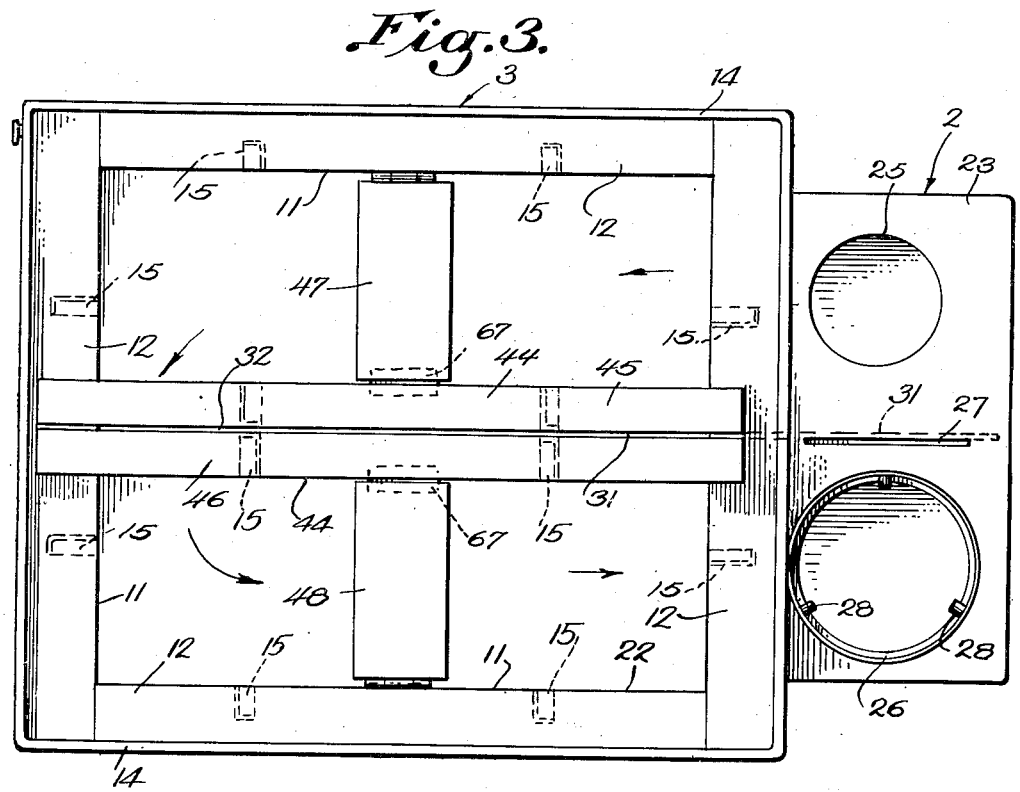
INVENTOR.
Carl C.H. Rasmussen
BY
William F. Desmond

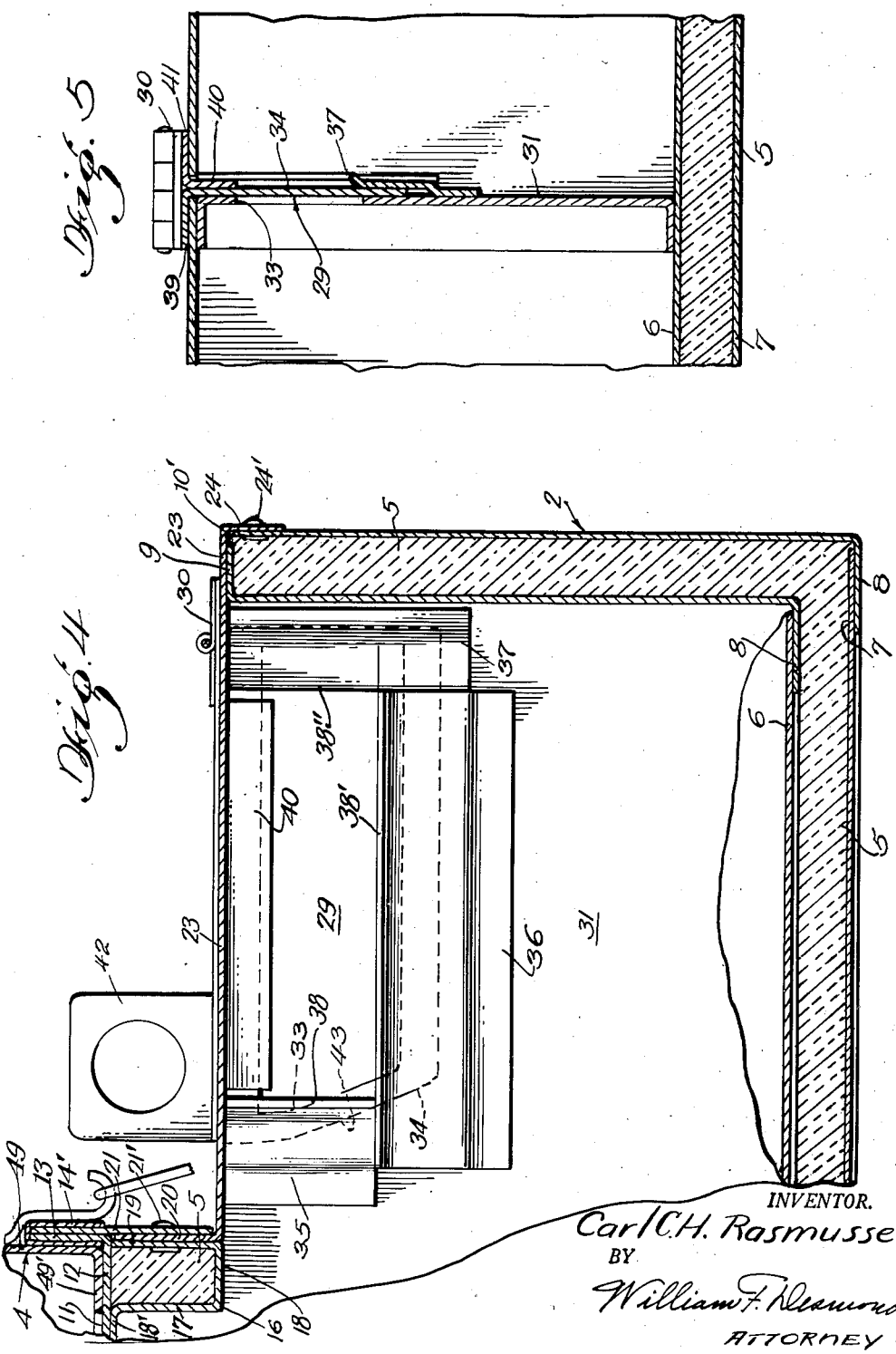

Patented May 3, 1949

2,468,778

UNITED STATES PATENT OFFICE 2,468,778

COOKING EQUIPMENT

Carl C. H. Rasmussen, Silver Spring, Md.

Application March 24, 1945, Serial No. 584,681

7 Claims. (Cl. 126—25)

(Granted under the act of March 3, 1883, as amended April 30, 1928; 370 O. G. 757)

The invention described herein, if patented, may be manufactured and used by or for the Government for governmental purposes, without the payment to me of any royalty thereon.

This invention relates to cooking equipment and more particularly to the type of cooking equipment adapted for out of doors use, so constructed and arranged as to form a compact unit for convenience of transportation and facility of operation.

It is an object of the invention to provide cooking equipment of the kind referred to wherein a stove constructed of sheet metal, and a burner and cooking utensils for use therewith, are adapted for assembly into a compact unit for convenience in transportation and ease in setting up for operation.

Further objects of the invention are to provide portable cooking equipment for field use wherein the heat loss, due to conduction through the sheet metal of the stove and radiation therefrom, is reduced to a minimum, and the detrimental effect of wind on the operation and effectiveness of the burner is obviated.

A further object of the invention is to provide a stove which uses gasoline as fuel and which is so constructed that the burner can be removed for cleaning, repair or replacement, without dismantling or detaching any part of the stove.

A still further object of the invention is the provision of a stove having a burner compartment adapted to support a burner and a smoke pipe, a heating compartment adapted to support the cooking utensils, means for causing the heat of the burner to circulate through the heating compartment from the burner to the smoke pipe, and means for permitting and controlling a flow of heat directly from the burner to the smoke pipe.

Still further objects of the invention are the provision of ruggedly and simply constructed cooking equipment capable of withstanding the rough usage to which such equipment is likely to be subjected, and wherein the stove, burner and cooking utensils are adapted to be assembled into a convenient and compact unit for ease of transportation and storage.

The novel features of construction, adaptation and operation of the invention are pointed out in the following specification and illustrated in the accompanying drawings wherein:

Figure 1 is a perspective view showing the cooking equipment set up ready for operation, but without a smoke pipe attached thereto;

Figure 2 is a vertical section, of the stove with the windshield in place thereon;

Figure 3 is a plan view of the heating compartment of the stove;

Figure 4 is an enlarged view showing in cross section the burner box and a portion, broken away, of the heating compartment and windshield;

Figure 5 is an enlarged fragmentary end sectional view of a portion of the burner box showing the arrangement of the draft gate therein; and, Figure 6 is a plan view showing the assembly of cooking utensils inside the windshield.

The illustrated cooking equipment comprises a stove indicated generally by the numeral 1, having an auxiliary compartment 2, a heating compartment 3, and a windshield 4, all constructed of sheet metal throughout.

The auxiliary compartment 2 and heating compartment 3 are of integral construction consisting of spaced apart inner and outer box bodies, each made up of sides and bottom, between which bodies is located an insulating material 5, such as asbestos.

The bottom 6 of the inner box body and the bottom 7 of the outer box body are each of one piece extending continuously beneath the auxiliary compartment and the heating compartment. The lower marginal edges of each of the side and end walls of both the inner and outer box units are turned under to form flanges 8, shown in Figs. 2 and 4, upon which rest the respective bottom plates 6 and 7. Flanges 8 may be secured to the bottom walls or plates 6 and 7 by spot welding or any other suitable means. The upper marginal edges of the inner sheet metal box member are bent outwardly as indicated at 9 in Figs. 2 and 4 to overlie the insulating layer 5 and form a horizontally extending ledge, while the upper marginal edges of the outer sheet metal box member extend vertically upwardly above the level of the horizontally extending portion 9, as indicated at 10 in Fig. 2, except along those portions which form the side walls and front wall of the auxiliary compartment 2 where these outer walls terminate at the level of the horizontal portion 9, as indicated at 10' in Figs. 2 and 4.

Angle plates 11 are seated upon the ledge formed by the horizontally extending portion 9 along the side walls and the back wall, that is, the wall of the heating compartment opposite the auxiliary compartment 2 as best seen in Figs. 2 and 3. These angle iron members are provided with horizontally extending webs 12 which seat upon and may be spot welded to the portions 9 and which extend inwardly to form a support for cooking vessels placed on the heating compartment, and vertically extending webs 13 which lie along the inner side of the vertical marginal edge portions 10 of the outer sheet metal box member. A U-shaped molding 14 engages over the edges 10 and the web 13 and is spot welded or otherwise secured to edges 10 and webs 13 to hold these parts in assembled relation. In this manner, a rigid thermal insulating wall is provided along all sides of the heating compartment 3 except over that portion of the front wall where it is joined by the auxiliary compartment 2. Along this portion a channel member 16, shown in Figs. 2 and 4, is provided which is formed with an inner vertical flange 17, a horizontal web 18, and an outer vertical flange 19. Thermal insulating material 5 is packed between these three walls of the channel member. An inwardly extending horizontal web 18' is formed on the channel member 16 by bending the upper marginal edge of its inner flange 17 into a horizontal plane. Upon this web 18' is seated an angle plate 11 which extends transversely of the front of the heating compartment 3 and has its inwardly extending horizontal web 12 secured to this web 18' by spot welding or other suitable means and has its vertical web 13 extending in alignment with a vertically extending flange 20 on the sheet metal top wall 23 of the auxiliary compartment 2. A horizontal plate 21 extends across the front of the heating compartment 3 and is secured to the web 13 of the front angle member 11 by means of a U-shaped molding 14' spot welded to the web 13 and plate 21. The ends of the plate 21 are secured to the front vertical wall of the outer sheet metal box member by rivets 21' shown in Figs. 1 and 4.

The front and side marginal edges of the sheet metal top 23 are bent downwardly to form flanges 24 which will engage the walls of the auxiliary compartment 2 and are riveted to the front wall as indicated at 24' in Figs. 1 and 4. An aperture 25 is provided on the top wall 23 for receiving a gaseous fuel burner of conventional construction, and a well 26 for receiving a stove pipe (not shown) is also formed in wall 23. Lugs 28 are provided in the walls of the well 26 for engagement in a series of bayonet slots provided on the lower end of the stove pipe to secure the latter in operative position.

It will be understood that the flow of the hot gases of combustion through the heating compartment must be controlled in order to secure the most effective heating therefrom. For this purpose a baffle plate 31 is provided which extends from the front wall of the auxiliary compartment to a point 32 spaced from the rear wall of the heating compartment 3, thus dividing the compartments into two passageways which communicate adjacent the rear end of the heating compartment so that the hot gases of combustion must make a complete circuit of the heating compartment, as indicated by arrows in Fig. 3, before they escape through the smokestack secured in the well 26. Baffle plate 31 is provided with a flange along its bottom and front edges and along that portion of its top edge which extends into the compartment 2 and these flanges are spot welded to those inner walls of the compartments which they engage for securing the baffle plate in position.

Adjacent the upper margin of that portion of the baffle plate which extends into the compartment 2, an aperture 33 is provided so that the burner and smoke-box sides of compartment 2 may be directly communicated. A draft gate 29 which extends through a slot 27 in the top wall 23 engages over the opening 33 so that communication therethrough can be controlled by adjusting the gate. This gate comprises a blade 34 having a horizontally extending flange 39 along its upper edge. A right angular shaped metallic strip 40 is secured along the upper edge of draft gate 29, and it has a flange 41 which extends horizontally of the blade 34 in a direction opposite to the flange 39 and in alignment therewith. Gate valve 29 is secured to the top 23 of a burner compartment by means of a hinge 30 which has one leaf secured to the flanges 39 and 41 and the other secured to the top 23 by any suitable means. An apertured handle 42 is also secured to the top of the gate valve. By grasping the handle with the hand or with a rod or other tool, if the stove is operating and is hot, the gate may be swung on the hinge 30 to raise and lower the blade and thus determine the portion of the opening 33 which is uncovered and thereby control direct communication between the burner and the smoke box.

In order to secure a snug engagement between the blade 34 of the draft gate 29 and the side of the baffle plate 31 so that the draft gate 29 will remain in a position of adujstment and to prevent leakage around the blade, a series of resilient clips 35, 36 and 37 are secured around the perimeter of the aperture 33 as shown in elevation in Fig. 4 and in cross section in Fig. 5. These clips bear against the sides of the blade 34 and press it into snug engagement with the sides of the baffle plate 31. The free edges of the clips are turned outwardly to form lips 38, 38' and 38'', so that the edge of blade 34 will not jam against the edge of the clips but will slide between the clips and the side of baffle 31.

Extending longitudinally of the heating compartment 3 is a pair of right angle supporting members 44 which have their vertical webs secured along the upper edge of baffle plate 31 by any suitable means throughout the co-extensive portions thereof, and are secured at the ends to the horizontal webs 12. In addition to these longitudinal supporting members, transverse supporting members 47 and 48 in the form of flat plates are provided hinged to the inner edge of the horizontally extending web 12 of longitudinal angle shaped members 11 at their medial point. The inner ends of these plates 47 and 48 rest upon plates 67 welded to the underside of the members 44 and projecting therebeyond as seen in Fig. 3. Thus these plates 47 and 48 can be raised for a purpose to be hereinafter described. Between them the webs 12 on angle members 11 which form the top edge of the heating compartment, the horizontal webs 45 and 46 on the members 44 and the transverse plates 47 and 48 form a grate for supporting cooking utensils on the heating compartment. A series of triangular shaped bracing elements 15 are welded to the underside of the webs 12 and the inner side walls of the heating compartment 3 and similar bracing elements are secured to webs 45 and 46 and to the vertical sides of the angular supporting members 44 to assist in supporting the weight of the cooking utensils placed on the heating compartment.

When the stove is in use, particularly if it is used in the open where it may be subjected to wind, the efficiency is greatly increased by providing a windbreak around the cooking utensils on the heating compartment which completely incloses them. For this purpose the windshield 4 is provided. This shield has a cross-sectional shape corresponding to that of the heating compartment 3, and is formed with side walls 49 of sheet metal the lower marginal edges of which are turned inwardly to form flanges 49' which rest on the webs 12 (Figs. 2 and 4) and support the windshield on the heating compartment while the upper marginal edges are beaded as indicated at 50. Reenforcement of the side walls is secured by means of vertically extending angle irons 51 secured along the inner surface of the side walls at each corner. One of these side walls of the windshield is provided with a door 52, shown in Fig. 1, hinged along a line slightly above the point to which the top edge of the heating compartment extends when the windshield is seated on it so that the door may be opened without difficulty when the two parts are in assembled relation. A latch 53 may be provided for holding the door in closed position.

On the front and back walls of the windshield adjacent its lower edge are secured the hooks 54 (Figs. 1 and 2) which are engaged by draw bolts 55 secured adjacent the upper edge of the heating compartment 3 for releasably locking the two units together. Loop handles 56 are provided on each end wall of the windshield so that it may be easily handled when it is to be placed in position or removed. These handles may also be used for carrying the entire stove when the windshield is locked to the heating compartment.

A cover 57 is provided for the top of the windshield having the downturned rim 58 about its perimeter which fits over the rolled upper edges 50 of the windshield and is held in place by hooks 59, which cooperate with the draw bolts 60 secured to the sides of the windshield. The down turned rim 58 extends over the upper edge of the door 52 and the latches 53 when the cover 57 is in place.

A smoke pipe (not shown) may be provided made up of nesting sections. The lowermost section of the smoke pipe is provided at its lower end with suitable slots to make a bayonet type connection with the lugs 28 in the smoke pipe attaching well 26.

A burner is provided of a suitable type for use with the stove, preferably using gasoline for fuel. The burner may be provided with the wing supports 61, shown in Figure 1, resting on the top 23 of the burner box about the margin of the opening 25 when the burner is inserted in the burner box.

The cooking equipment includes a number of utensils adapted to be nested together and contained within the space defined by the windshield 4 when the equipment is assembled for transportation. The pan 62 is of a size to fit closely the inside of the windshield resting upon the strips 47 and 48 and the horizontal webs 12, 45 and 46, and completely closing the top of the heating compartment. The cooking pots 63 and 64 are also provided, these being of such dimensions that together they will completely cover the opening in the top of the heating compartment, while the pan 64 is small enough to nest within the pan 63. Smaller pots 68 are provided which together are sufficient in area to cover one-half of the opening at the top of the heating compartment and are used together with a pan covering the other half of the opening. The cooking equipment also includes frying pans 65, 66 likewise dimensioned to cover together the entire opening in the top of the heating compartment.

The manner in which all of the above described pans can be assembled in the windshield 4 is illustrated in plan in Figure 6. The burner, and nested sections of stove pipe are adapted to be stored away in the heating compartment 3 by lifting the hinged strips 47, 48 so that they may be placed beneath the same.

Assuming that the equipment is completely assembled for transportation and it is desired to set it up for use, the cover 57 is first removed by releasing the draw bolts 60 from the hooks 59 and all of the utensils lifted out of the windshield. The hinged strips 47, 48 are raised and the burner and stove pipe removed from the heating compartment 3. The burner is then inserted downwardly through the burner opening 25 into the compartment 2, the wings 61 maintaining the burner in position. The nested smoke pipe sections are fitted together, and the lowermost section is attached to the smoke pipe well 26. Such pots and pans as are desired for cooking are then placed inside the windshield vesting upon the strips 47 and 48 and the webs 12, 45 and 46, so that the opening in the top of the heating compartment is completely covered. The equipment is then in condition to begin cooking.

Upon lighting the burner the hot gases of combustion therefrom flow from the burner through the heating compartment 3 to the smoke pipe well 26 in the direction indicated by the arrows in Fig. 3 and thence out through the smoke pipe.

The draft through the passage in the heating compartment is controlled by raising or lowering the draft gate 29 through the slot 27 the gate being held in whatever position it is placed by the friction of its contact with the baffle plate 31 caused by the seal clips 35, 36, 37.

When the frying pans 65, 66 are in use the door 52 may be opened to secure easier access to the interior of the windshield 4. The loss of heat from the sides and bottom of the heating compartment 3 is greatly reduced by the insulating material 5 extending completely around the sides and across the bottom thereof, resulting in increased efficiency in operation of the equipment and increased comfort and protection to the operator.

The windshield 4 serves to protect the cooking utensils and confine the heat from the heating compartment 3 as well as to maintain the utensils in position thereon.

When it is desired to reassemble the equipment for transportation the burner is removed from the opening 25 and is stored away in the heating compartment 3 beneath the hinged strip 47. The smoke pipe is detached from the smoke pipe well 26, its sections separated, nested together, and stored away in the heating compartment beneath the hinged strip 48. The utensils are placed inside the windshield 4 in the nested relation previously referred to and the cover 57 secured in place. The entire assembly can then be lifted up as a unit by the loop handles (56) attached to the windshield and transported in any convenient manner.

For the purpose of facilitating the handling of the equipment, especially when employing transportation means requiring the equilizing of the load, the windshield 4 may be removed from the heating compartment 3 and these two parts treated as separate units approximating each other in weight.

It will readily be seen that the invention as disclosed herein provides cooking equipment combining compactness in a high degree and great flexibility in the manner of its use.

Having thus clearly described the invention, what is claimed and desired to secure by Letters Patent is:

1. In a portable gaseous fuel burning cooking stove the combination comprising a heating compartment having thermally insulating bottom and side walls and an open top, means for supporting cooking utensils on said open top in position to cover the same, an auxiliary compartment projecting from and communicating with one end of said heating compartment, said last compartment having thermally insulating bottom and side walls and an apertured top, a baffle extending into said auxiliary and heating compartments, said baffle dividing said auxiliary compartment into a fire-box for housing a gaseous fuel burner insertable into said auxiliary compartment through said apertured top and into a smoke-box forming an exit for the gases of combustion, and said baffle dividing said heating compartment into two longitudinal passageways for hot gases of combustion from said fire-box to said smoke-box through said heating compartment, said passageways communicating with each other proximate the other end of said heating compartment, and one of said passageways communicating with said fire-box projecting from said heating compartment and the other passageway communicating with the smoke-box projecting from heating compartment, whereby a circuitous path for said hot gases beneath substantially the entire area of said open top is defined.

2. In a portable gaseous fuel burning cooking stove the combination comprising a heating compartment having thermally insulating bottom and side walls and an open top, means for supporting cooking utensils on said open top in position to cover the same, an auxiliary compartment projecting from and communicating with said heating compartment, said last compartment having thermally insulating bottom and side walls, a baffle extending into said auxiliary and heating compartments, said baffle dividing said auxiliary compartment into a fire-box for housing a gaseous fuel burner and a smoke-box forming an exit for the gases of combustion and defining a circuitous passageway for hot gases of combustion from said fire-box to said smoke-box through said heating compartment, an aperture in said baffle for directly communicating said fire-box and said smoke-box, a slide valve for regulating direct communication through said aperture and thereby controlling the volume of hot gases of combustion flowing through said heating compartment, resilient means on said baffle to urge said slide valve into engagement with said baffle, and means on the outside of said auxiliary compartment for regulating said slide valve.

3. In a portable gaseous fuel burning cooking stove the combination comprising a heating compartment having thermally insulating bottom and side walls and an open top, means for supporting cooking utensils on said open top in position to cover the same, an auxiliary compartment communicating with said heating compartment, said last compartment having thermally insulating bottom and side walls, a baffle extending into said auxiliary and heating compartments, said baffle dividing said auxiliary compartment into a fire-box for housing a gaseous fuel burner and a smoke-box forming an exit for the gases of combustion and defining a circuitous passageway for hot gases of combustion from said fire-box to said smoke-box through said heating compartment, a windshield adapted to be detachably secured on said heating compartment for completely enclosing the cooking utensils thereon, and a cover engageable with said windshield to convert said windshield and said heating compartment into a covered storage compartment when said cover, windshield and heating compartment are in assembled relation.

4. In a portable gaseous fuel burning cooking stove the combination comprising a heating compartment having thermally insulating bottom and side walls and an open top, means for supporting cooking utensils on said open top in position to cover the same, an auxiliary compartment communicating with said heating compartment, said last compartment having thermally insulating bottom and side walls, a baffle extending into said auxiliary and heating compartments, said baffle dividing said auxiliary compartment into a fire-box for housing a gaseous fuel burner and a smoke-box forming an exit for the gases of combustion and defining a circuitous passageway for hot gases of combustion from said fire-box to said smoke-box through said heating compartment, a windshield adapted to seat on said heating compartment for completely enclosing the cooking utensils thereon, means for releasably locking said heating compartment and windshield in assembled relation and a plurality of handles secured on said windshield, said handles being adapted for grasping to move said windshield alone or said windshield and heating compartment together when the two are locked together in assembled relation.

5. In a portable gaseous fuel burning cooking stove the combination comprising a heating compartment having thermally insulating bottom and side walls and an open top, an auxiliary compartment integral and communicating with said heating compartment, said last compartment having thermally insulating bottom and side walls, a baffle extending into said auxiliary and heating compartments, said baffle dividing said auxiliary compartment into a fire-box for housing a gaseous fuel burner and a smoke-box forming an exit for the gases of combustion and defining a circuitous passageway for gases of combustion from said fire-box to said smoke-box through said heating compartment, fixed utensil supporting members secured to said baffle proximate its upped edge and hinged utensil supporting members proximate the upper edge of said heating compartment and adapted to be swung from operative position to facilitate access to interior of said heating compartment.

6. In a portable gaseous fuel burning cooking stove the combination comprising a heating compartment having thermally insulating bottom and side walls and an open top, an auxiliary compartment integral and communicating with said heating compartment, said last compartment having thermally insulating bottom and side walls, a baffle extending into said auxiliary and heating compartments, said baffle dividing said auxiliary compartment into a fire-box for housing a gaseous fuel burner and a smoke-box forming an exit for the gases of combustion and defining a circuitous passageway for gases of combustion from said fire-box to said smoke-box through said heating compartment, perimetrically extending utensil supporting members secured on said heating compartment and transversely extending utensil supporting members hingedly secured intermediate the end walls of said heating compartment, said transverse members being adapted to be swung from operative position to facilitate access to the interior of said heating compartment.

7. In a portable gaseous fuel burning cooking stove the combination comprising a heating compartment having thermally insulating bottom and side walls and an open top, means for supporting cooking utensils on said open top in position to cover the same, an auxiliary compartment projecting from and communicating with one end of said heating compartment, said last compartment having thermally insulating bottom and side walls, a baffle extending into said auxiliary and heating compartments, said baffle dividing said auxiliary compartment into a fire-box for housing a gaseous fuel burner and into a smoke-box forming an exit for the gases of combustion, and said baffle dividing said heating compartment into two longitudinal passageways for hot gases of combustion from said fire-box to said smoke-box through said heating compartment, said passageways communicating with each other proximate the other end of said heating compartment, and one of said passageways communicating with said fire-box projecting from said heating compartment and the other passageway communicating with the smoke-box projecting from heating compartment, whereby a circuitous path for said hot gases beneath substantially the entire area of said open top is defined, a perimetrically extending rim on said heating compartment and a windshield adapted to be seated on said heating compartment, said windshield completely inclosing the cooking utensils on said heating compartment and having the marginal edges of its side walls confined within and engaging said rim.

CARL C. H. RASMUSSEN.

REFERENCES CITED

The following references are of record in the file of this patent:

UNITED STATES PATENTS

| Number | Name | Date |
|---|---|---|
| 124,347 | Ferris | Mar. 5, 1872 |
| 129,049 | Oakley | July 16, 1872 |
| 165,508 | Robarts | July 13, 1875 |
| 206,422 | Collier | July 30, 1878 |
| 282,235 | Stern | July 31, 1883 |
| 359,229 | Robinson | Mar. 8, 1887 |
| 485,049 | Marcee | Oct. 25, 1892 |
| 523,920 | Sinclair | July 31, 1894 |
| 858,872 | Kimmel | July 2, 1907 |
| 860,466 | Hatcher | July 16, 1907 |
| 1,090,227 | Paulson | Mar. 17, 1914 |
| 2,053,577 | Pearson | Sept. 8, 1936 |
| 2,061,336 | Stuart | Nov. 17, 1936 |

FOREIGN PATENTS

| Number | Country | Date |
|---|---|---|
| 17,310 | Great Britain | 1910 |
| 23,966 | Austria | Apr. 25, 1906 |
| 177,182 | Switzerland | Aug. 1, 1935 |

Certificate of Correction

Patent No. 2,468,778.                                                                                          May 3, 1949.

CARL C. H. RASMUSSEN

It is hereby certified that errors appear in the printed specification of the above numbered patent requiring correction as follows:

Column 3, line 41, after the word "which" strike out "will"; column 4, line 29, for "adujstment" read *adjustment*; column 6, line 69, for "equilizing" read *equalizing*; column 8, line 54, claim 5, for "upped" read *upper*;

and that the said Letters Patent should be read with these corrections therein that the same may conform to the record of the case in the Patent Office.

Signed and sealed this 11th day of October, A. D. 1949.

[SEAL]

THOMAS F. MURPHY,
*Assistant Commissioner of Patents.*